(12) United States Patent
Kiyono et al.

(10) Patent No.: US 12,487,331 B2
(45) Date of Patent: Dec. 2, 2025

(54) OPTICAL DETECTOR

(71) Applicant: DENSO CORPORATION, Kariya (JP)

(72) Inventors: Mitsuhiro Kiyono, Kariya (JP); Teiyuu Kimura, Kariya (JP); Noriyuki Ozaki, Kariya (JP); Kenichi Yanai, Kariya (JP); Shinji Kashiwada, Kariya (JP); Fumiaki Mizuno, Kariya (JP); Kazuhisa Onda, Kariya (JP)

(73) Assignee: DENSO CORPORATION, Kariya (JP)

( * ) Notice: Subject to any disclaimer, the term of this patent is extended or adjusted under 35 U.S.C. 154(b) by 1166 days.

(21) Appl. No.: 17/161,441

(22) Filed: Jan. 28, 2021

(65) Prior Publication Data

US 2021/0239802 A1 Aug. 5, 2021

(30) Foreign Application Priority Data

Jan. 31, 2020 (JP) .................. 2020-015008

(51) Int. Cl.
*G01S 7/481* (2006.01)
*G01S 7/4861* (2020.01)
*G01S 17/08* (2006.01)

(52) U.S. Cl.
CPC .......... *G01S 7/4813* (2013.01); *G01S 7/4817* (2013.01); *G01S 7/4861* (2013.01); *G01S 17/08* (2013.01)

(58) Field of Classification Search
CPC .... G01S 7/4811; G01S 7/4813; G01S 7/4814; G01S 7/4815; G01S 7/4816; G01S 7/4817; G01S 7/484; G01S 7/4861; G01S 17/04; G01S 17/06; G01S 17/08; G01S 17/10
See application file for complete search history.

(56) References Cited

U.S. PATENT DOCUMENTS 9,470,520 B2 10/2016 Schwarz et al.
10,281,923 B2 5/2019 Boehmke
2005/0168720 A1* 8/2005 Yamashita ............ G01S 7/4817
356/5.01

(Continued)

FOREIGN PATENT DOCUMENTS

JP 2009-236774 A 10/2009
JP 2017-20917 A 1/2017

OTHER PUBLICATIONS

U.S. Appl. No. 17/161,434 and its entire file history, filed Jan. 28, 2021, Kiyono et al.

*Primary Examiner* — Yuqing Xiao
*Assistant Examiner* — Zhengqing Qi
(74) *Attorney, Agent, or Firm* — Maschoff Brennan (57) ABSTRACT

An optical detector is configured to project a projection beam toward a measurement area and detect a return beam from the measurement area. The optical detector includes: a projecting optical system that forms a projection optical axis to project the projection beam; a receiving optical system that forms a receiving optical axis to receive the return beam, and a housing having a housing chamber to house the projecting optical system and the receiving optical system, and an optical window for the projection beam and the return beam to travel between the housing chamber and the measurement area. The projection optical axis and the receiving optical axis are offset from each other to define an overlap region inside the housing chamber where footprints of the projection beam and the return beam overlap with each other.

16 Claims, 5 Drawing Sheets

(56) References Cited

U.S. PATENT DOCUMENTS

| | | | |
|---|---|---|---|
| 2012/0227263 A1* | 9/2012 | Leclair | G01S 7/4812 29/868 |
| 2013/0153772 A1* | 6/2013 | Rossi | G01J 1/0411 250/353 |
| 2016/0096474 A1* | 4/2016 | Sakai | B60Q 9/008 356/5.01 |
| 2016/0274223 A1 | 9/2016 | Imai | |
| 2017/0167868 A1* | 6/2017 | Hirai | G01S 7/4817 |
| 2018/0094793 A1 | 4/2018 | Yokota et al. | |
| 2018/0284231 A1* | 10/2018 | Russell | G01S 7/489 |
| 2019/0154815 A1 | 5/2019 | Oohata | |
| 2019/0212419 A1* | 7/2019 | Jeong | G01S 17/08 |
| 2019/0257946 A1* | 8/2019 | Ando | G01S 17/08 |
| 2019/0293948 A1* | 9/2019 | Ramthun | G01S 7/4815 |
| 2020/0363510 A1* | 11/2020 | Noguchi | G02B 26/10 |

* cited by examiner

OPTICAL DETECTOR

CROSS REFERENCE TO RELATED APPLICATION

This application is based on Japanese Patent Application No. 2020-015008 filed on Jan. 31, 2020, the disclosure of which is incorporated herein by reference in its entirety.

TECHNICAL FIELD

The present disclosure relates to an optical detector.

BACKGROUND

An optical detector is provided, in which a projection optical axis by the projected beam and a receiving optical axis by the reflected beam are aligned with each other.

SUMMARY

According to an aspect of the present disclosure, an optical detector is configured to project a projection beam toward a measurement area and detect a return beam from the measurement area. The optical detector includes: a projecting optical system that forms a projection optical axis to project the projection beam; a receiving optical system that forms a receiving optical axis to receive the return beam; and a housing having a housing chamber to house the projecting optical system and the receiving optical system, and an optical window for the projection beam and the return beam to travel between the housing chamber and the measurement area. The projection optical axis and the receiving optical axis are offset from each other to define an overlap region inside the housing chamber where footprints of the projection beam and the return beam overlap with each other.

DESCRIPTION OF EMBODIMENTS

To begin with, examples of relevant techniques will be described.
An optical detector is provided, in which a projection optical axis by the projected beam and a receiving optical axis by the reflected beam are aligned with each other.
However, an additional optical component such as a mirror is required in order to realize a configuration in which the projection optical axis and the receiving optical axis are matched. Therefore, the physique of the optical detector becomes large.

The present disclosure provides an optical detector having a configuration that can be easily downsized.

According to an aspect of the present disclosure, an optical detector is configured to project a projection beam toward a measurement area and detect a return beam from the measurement area. The optical detector includes: a projecting optical system that forms a projection optical axis to project the projection beam; a receiving optical system that forms a receiving optical axis to receive the return beam; and a housing having a housing chamber to house the projecting optical system and the receiving optical system, and an optical window for the projection beam and the return beam to travel between the housing chamber and the measurement area. The projection optical axis and the receiving optical axis are offset from each other to define an overlap region inside the housing chamber where footprints of the projection beam and the return beam overlap with each other.

Accordingly, the overlap region is provided inside the housing chamber, where the footprint is shared between the projection beam and the return beam. Therefore, it is possible to reduce the housing chamber by the volume of the overlap region. In addition, since the projection optical axis and the receiving optical axis are offset from each other, a space for arranging an additional optical component for aligning the optical axes is not needed, so that the housing chamber is reduced. Therefore, it is possible to provide an optical detector having a configuration that can be easily downsized.

It should be noted that the reference numerals are merely illustrative of the correspondence in the embodiments described below, and are not intended to limit the technical scope.

An embodiment will be described with reference to the drawings.

First Embodiment

Figure 1:
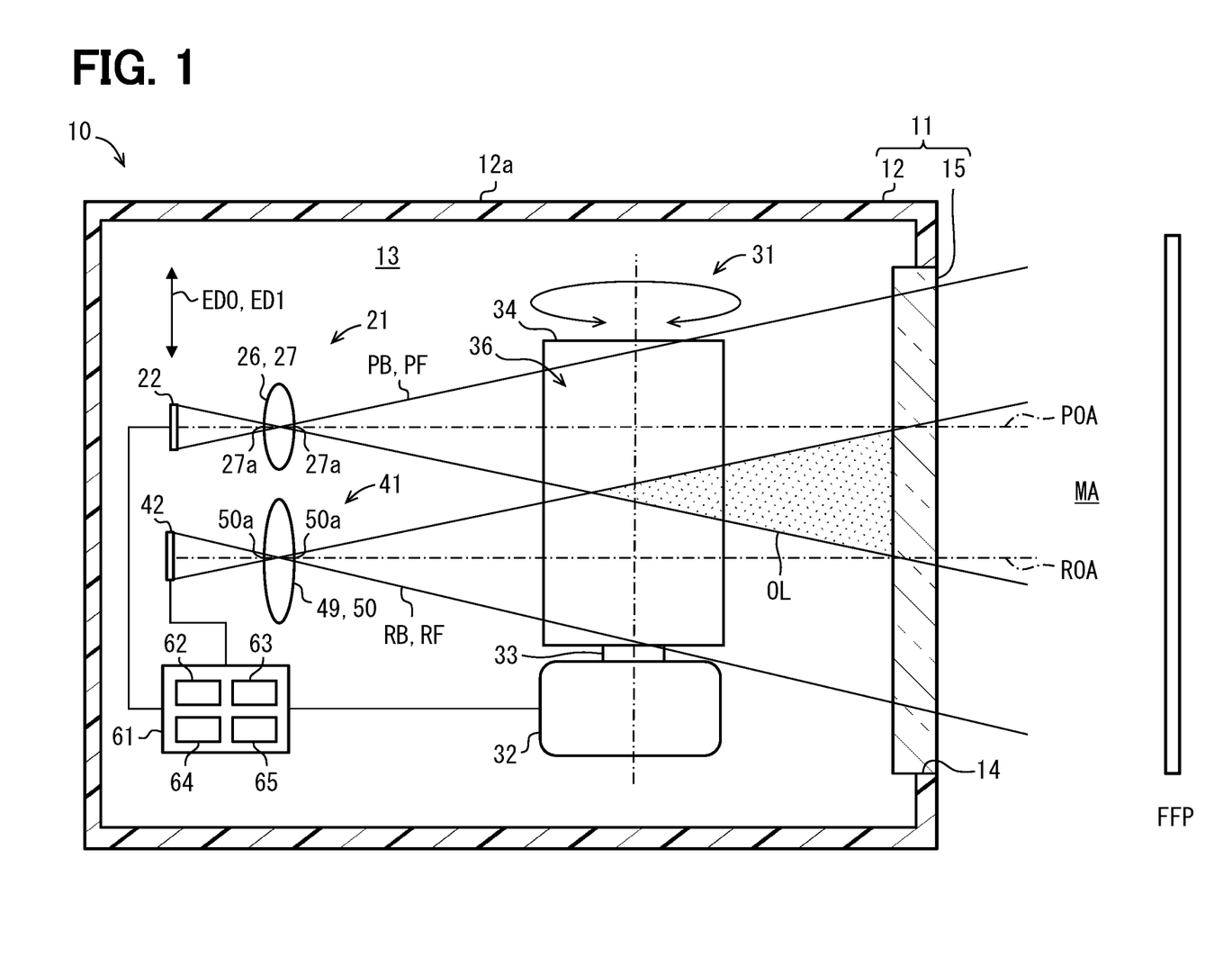
FIG. 1 is a diagram showing an overall configuration of an optical detector.

As shown in FIG. 1, an optical detector 10 according to a first embodiment is a LiDAR (Light Detection and Ranging/Laser Imaging Detection and Ranging) to be mounted on a vehicle as a movable unit. For example, the optical detector 10 is arranged on a front portion, a left/right portion, a rear portion, or a roof of the vehicle. The optical detector 10 scans a projection beam PB toward a predetermined measurement area MA around the vehicle in an area outside the optical detector. The optical detector 10 detects a return beam (hereinafter, referred to as a reflected beam RB) which is the projection beam PB reflected by a measurement target. For the projection beam PB, light in the near-infrared region that is difficult for human beings to visually recognize is usually selected.

The optical detector 10 can measure the measurement target by detecting the reflected beam RB. The measurement of the measurement target is, for example, measurement of the distance from the optical detector 10 to the measurement target, the direction in which the measurement target is present, and the like. In the optical detector 10 applied to the vehicle, typical measurement targets are pedestrians, cyclists, animals other than humans, movable objects such as other vehicles, and stationary objects such as guardrails, road signs, roadside structures, and objects on the road.

In the present embodiment, unless otherwise specified, the front, rear, upper, lower, left, and right directions are defined with reference to the vehicle on the horizontal plane. Further, the horizontal direction indicates a tangential direction to the horizontal plane, and the vertical direction indicates a vertical direction to the horizontal plane.

The optical detector 10 includes a housing 11, a light projecting unit 21, a scanning unit 31, a light receiving unit 41, and a controller 61. The housing 11 has a light shielding container 12 and a cover plate 15.

The light shielding container 12 is made of, for example, synthetic resin or metal, and is formed in a box shape having an outer wall 12a with a light shielding property. The light shielding container 12 may be configured by one component or may be configured by combining plural components. The light shielding container 12 includes a housing chamber 13 surrounded by the outer wall 12a to house the light projecting unit 21, the scanning unit 31, the light receiving unit 41, and the controller 61. The housing chamber 13 is commonly provided for the light projecting unit 21 and the light receiving unit 41, and one housing chamber is provided in the present embodiment. Since the housing chamber 13 is shared by the light projecting unit 21 and the light receiving unit 41, it is possible to eliminate a partition wall between the light projecting unit 21 and the light receiving unit 41. Thus, it is possible to suppress increase in the size of the optical detector 10.

The light shielding container 12 has an optical window 14, which is opened, through which both the projection beam PB and the reflected beam RB reciprocate between the housing chamber 13 and the measurement area MA. The optical window 14 is provided commonly to both the light projecting unit 21 and the light receiving unit 41, and one optical window is provided in the present embodiment.

The cover plate 15 is a member formed in a plate shape (for example, a flat plate shape) capable of transmitting both the beams PB and RB, and is made of a base material, for example, synthetic resin or glass. The cover plate 15 is arranged to cover the entire optical window 14, and blocks foreign substances from entering the housing chamber 13 from the outside.

The cover plate 15 transmits light in the near-infrared region by coloring the base material, forming an optical thin film, or attaching a film to the surface of the base material. Further, it is preferable to have wavelength dependency of transmittance that shields visible light, so as to prevent the inside of the housing chamber 13 from being seen from the outside. A mirror-like surface of the base material may be exposed from a surface of the cover plate 15 facing the housing chamber 13 and/or a surface of the cover plate 15 facing the measurement area MA. An antireflection film or moth-eye structure may be provided on the surface of the cover plate 15 facing the housing chamber 13 and/or the surface of the cover plate 15 facing the measurement area MA.

For example, the cover plate 15 may have a flat plate shape. In this case, the accuracy of detecting the position of the measurement target can be raised by suppressing an angle change caused by the refraction of the projection beam PB passing through the cover plate 15 and an angle change caused by the refraction of the reflected beam RB.

Figure 2:
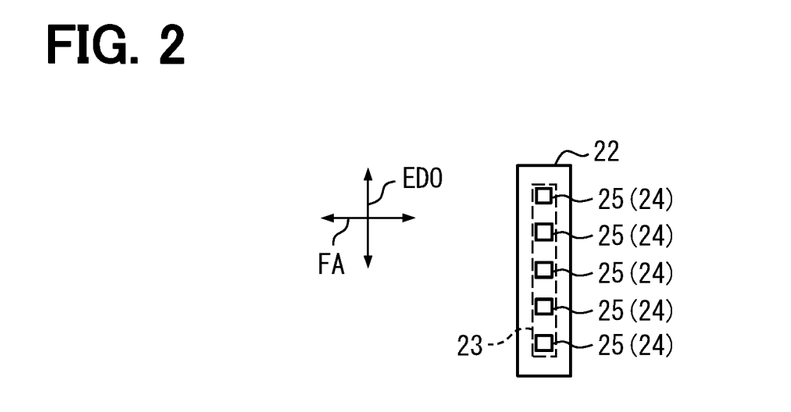
FIG. 2 is a diagram showing a light emitting portion.

The light projecting unit 21 includes a light emitting unit 22, a projecting optical system 26, and a projection holding member 28. As shown in FIG. 2, the light emitting unit 22 has plural laser oscillation elements 24 arranged in an array along the extension direction ED0 so as to form a light emitting window 23 elongated in the extension direction ED0. The light emitting unit 22 uses the plural laser oscillation elements 24 to increase the overall output of laser light. The light emitting unit 22 projects the projection beam PB from the light emitting window 23 at a light emission timing in response to the electric signal from the controller 61.

Each of the laser oscillation elements 24 may be, for example, laser diode (LD). Each of the laser oscillation elements 24 has a structure in which a P-type semiconductor and an N-type semiconductor are bonded to each other via a PN junction layer, and a resonator structure that resonates the light generated in the PN junction layer. In the resonator structure, the PN junction layer is arranged between mirrors, and one of the mirrors forms a half-mirror small window 25. Each of the laser oscillation elements 24 can emit laser light as coherent light in a beam state through the small window 25. This laser light is a small beam that forms a part of the projection beam PB. In the present embodiment, a group of beamlets oscillated from each of the windows 25 is defined as the projection beam PB. The PN junction layer of each laser oscillation element 24 is set along a direction perpendicular to the arrangement direction of the small windows 25 (that is, the extension direction ED0). An axis along the perpendicular direction is a fast axis FA of the laser diode.

The plural small windows 25 are arranged as close as possible to each other, to form the light emitting window 23 as a macroscopic opening formed by the aggregate of the small windows 25. The light emitting window 23 of the present embodiment has a substantially rectangular shape. The dimension of the light emitting window 23 in the extension direction ED0 is set to be, for example, 100 times or more larger than that in the direction perpendicular to the extension direction ED0 (the direction along the fast axis FA).

When the optical detector is mounted on a vehicle in a general form, the extension direction ED0 of the light emitting window 23 is along the vertical direction. The fast axis FA is along the horizontal direction when the optical detector is mounted on a vehicle.

Each of the laser oscillation elements 24 oscillates a linearly-polarized light in TE mode so that the polarization directions of the laser beams are common and along the extension direction ED0. Then, since the polarization direction of the projection beam PB is along the vertical direction in the vehicle mounted state, the projection beam PB can be incident on the road surface substantially along the horizontal direction with the perpendicularly polarization direction. Therefore, the regular reflectance is reduced, and the diffuse reflectance is increased. Thus, the reflected beam RB can be easily returned from the road surface to the optical window 14 when raining or freezing.

The projection beam PB is oscillated in a short pulse manner. The respective small beams emitted from each of the laser oscillation elements 24 may be oscillated substantially simultaneous, or may be sequentially oscillated with a slight time difference. The projection beam PB travels to the measurement area MA via the projecting optical system 26 and the scanning mirror 34 of the scanning unit 31.

The projecting optical system 26 collects and projects the projection beam PB emitted from the light emitting unit 22. The projecting optical system 26 is arranged between the light emitting unit 22 and the scanning mirror 34. The projecting optical system 26 includes at least one optical lens 27. The projecting optical system 26 forms a projection optical axis POA. The projection optical axis POA is defined as an axis, for example, along an imaginary ray passing through the center of curvature of the respective refracting surface of the optical lenses 27. The imaginary ray along the projection optical axis POA can pass through the projecting optical system 26 by going straight through each lens vertex 27a without being deflected. In this embodiment, the principal ray of the projection beam PB emitted from the center point of the light emitting window 23 is along the projection optical axis POA. When the center point of the light emitting window 23 is located in the gap between the small windows 25, the principal ray of the projection beam PB is an imaginary ray in optical design. When the light beam along the projection optical axis POA is deflected by the scanning unit 31, the projection optical axis POA is also defined as including an extended portion along the deflection direction.

Figure 3:
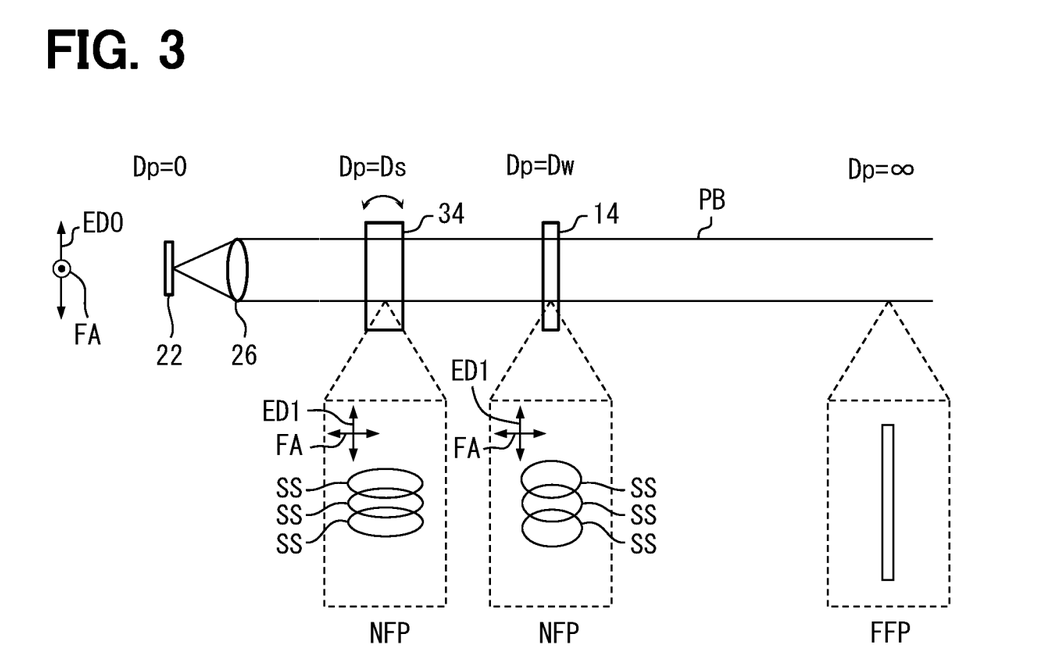
FIG. 3 is a diagram for explaining a spot shape of a projection beam.

The focal length of the projecting optical system 26 is substantially equal to the distance from the principal point of the projecting optical system 26 to the light emitting window 23 along the projection optical axis POA. As shown in FIG. 3, the projecting optical system 26 collimates the projection beam PB emitted from the light emitting window 23. The distance Dp from the light emitting window 23 along the projection optical axis POA is infinity at a position (Dp=∞) that is a point conjugate with the light emitting window 23, outside the housing chamber 13, on the opposite side of the light emitting window 23 through the projecting optical system 26 in the optical path. The spot shape of the projection beam PB at the infinity is a far field pattern FFP. An image corresponding to the light emitting window 23 is formed at the infinity, but this image is more affected by the diffraction in the extension direction ED0 than the near field pattern NFP. Therefore, the spot shape of the projection beam PB at the infinity has a line shape in which each small beam is elongated along the extension direction ED0, for example, while leaving the gap between the small windows in the light emitting window 23. Alternatively, the spot shape of the projection beam PB at the infinity has a line shape in which the small beams are integrated and elongated along the extension direction ED0, since the gap between the small windows 25 in the light emitting window 23 is substantially eliminated.

In the housing chamber 13 where the distance Dp from the light emitting window 23 is small, the spot shape of the projection beam PB is the near field pattern NFP. This spot shape is less affected by diffraction in the extending direction of the fast axis FA than the far field pattern FFP. The small spots SS corresponding to the respective small beams can be separately recognized in this spot shape. Each small spot SS has an elliptical pattern in which the fast axis FA corresponds to the long axis. The small spots SS may be completely separated from each other, or may be partially overlapped with each other.

The range of the footprint PF of the projection beam PB may be defined by the light emitting window 23 that functions as a substantial diaphragm, while the image formation mode is adjusted by the projecting optical system 26. The projection optical axis POA penetrates the center point of the light emitting window 23. Alternatively, the range of the footprint PF may be defined by disposing a diaphragm, in which the projection optical axis POA penetrates the center point, in the projecting optical system 26. The footprint in this embodiment means a space that can be covered by the trajectory of beam that contributes to the measurement.

Figure 4:
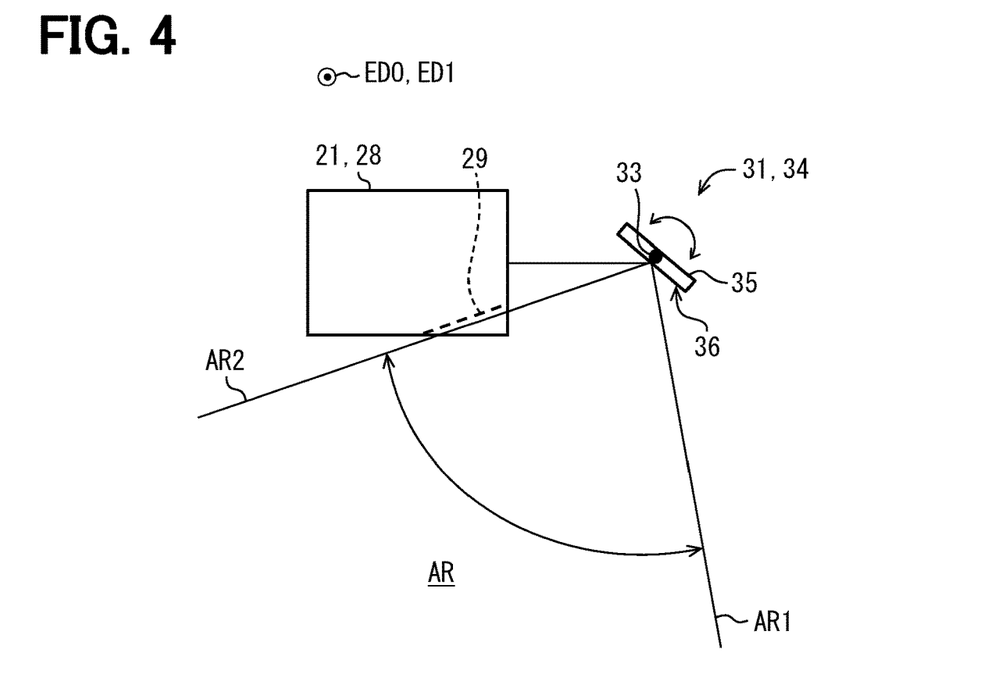
FIG. 4 is a diagram for explaining scanning by a scanning mirror.
Figure 5:
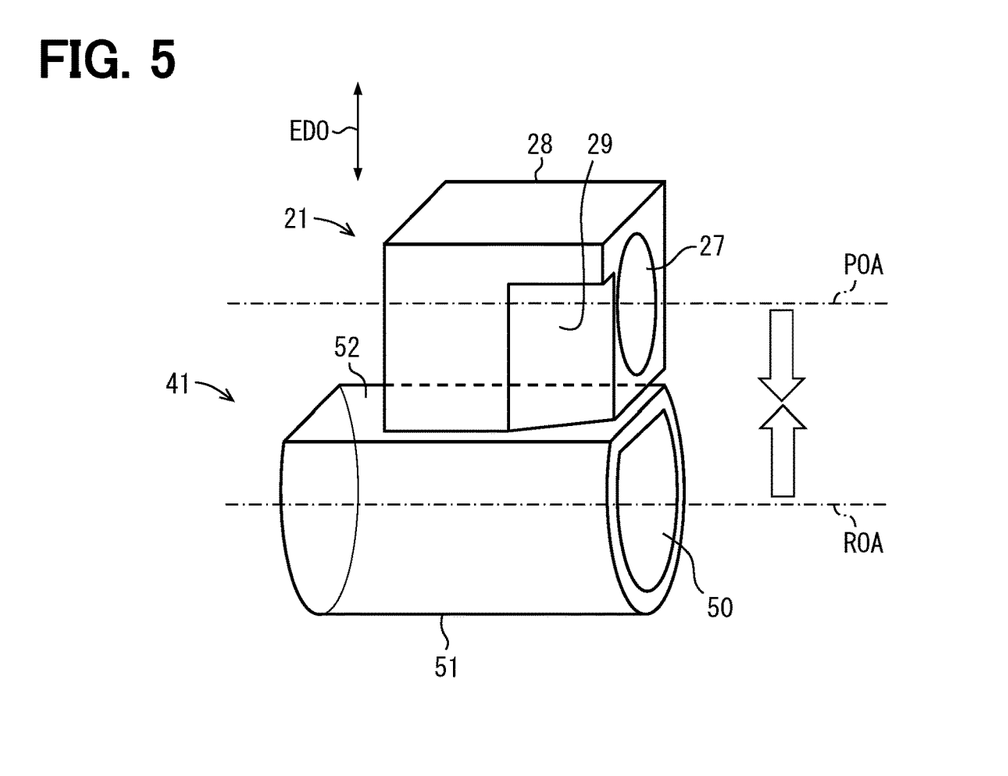
FIG. 5 is a diagram showing a positional relationship between a light projecting unit and a light receiving unit.

The projection holding member 28 shown in FIGS. 4 and 5 is formed in a tubular shape that holds one or more optical lenses 27 of the projecting optical system 26. The projection holding member 28 is formed of, for example, synthetic resin or metal so as to have a light-shielding property, as a lens barrel of the projecting optical system 26. The projection holding member 28 may be formed so as to further hold the light emitting unit 22.

As shown in FIGS. 1 and 4, the scanning unit 31 includes a drive motor 32, and a scanning mirror 34. The drive motor 32 may be, for example, a voice coil motor, a brushed DC motor, a stepping motor, or the like. The drive motor 32 drives the rotation shaft 33 mechanically coupled to the scanning mirror 34 with a rotation amount and a rotation speed in response to the electric signal from the controller 61. The rotation shaft 33 is arranged along an extension corresponding direction ED1 corresponding to the extension direction ED0 of the light emitting window 23. When the light emitting window 23 is virtually projected onto an object (for example, the reflecting surface 36 of the scanning mirror 34) on the optical path along the projection optical axis POA, the projection of the light emitting window 23 on the object (for example, on the reflecting surface 36) is along the extension corresponding direction ED1. In the present embodiment, the rotation shaft 33 substantially coincides with the extension direction ED0 of the light emitting window 23.

The scanning mirror 34 is capable of reflecting and scanning the projection beam PB. The scanning mirror 34 has a main body 35 and a reflecting surface 36. The scanning mirror 34 is mechanically coupled to the rotation shaft 33, and is formed in a flat plate made of, for example, synthetic resin. The reflecting surface 36 is formed into a mirror surface, for example, by depositing a metal film such as aluminum on one surface of the main body 35. The reflecting surface 36 is, for example, flat and extends along the direction parallel to the rotation shaft 33 so as to include the extension corresponding direction ED1.

The reflecting surface 36 is commonly provided for both of the beams PB and RB. The reflecting surface 36 is formed in a rectangular shape whose longitudinal direction substantially coincides with the extension corresponding direction ED1. As shown in FIG. 3, the reflecting surface 36 is placed at the position where the image of the light emitting window 23 is in a non-image state, between the projecting optical system 26 and the conjugate point of the light emitting window 23, on the projection optical axis POA. The reflecting surface 36 is provided so that the projection beam PB is incident outside the range of the depth of focus by the image of the light emitting window 23 that is imaged at infinity. That is, the reflecting surface 36 is located further away from the projecting optical system 26 than the end of the depth of focus facing the projecting optical system 26. Therefore, the projection beam PB is incident on the reflecting surface 36 in a state where the circle of confusion in the image of the light emitting window 23 is larger than or equal to the permissible circle of confusion. The diameter of the permissible circle of confusion in the image of the light emitting window 23 may be, for example, the dimension of the small window 25 in the extension direction ED.

Further, the reflecting surface 36 is arranged at a position (Dp=Ds) where the spot shape of the projection beam PB forms the near field pattern NFP. That is, each small spot SS of the projection beam PB on the reflecting surface 36 has an elliptical shape in which the extension corresponding direction ED1 correspond to the minor axis. Therefore, as compared with an aspect ratio of the light emitting window 23 having the elongated shape and the line-shaped spot at the infinity, the aspect ratio of the projection beam PB on the reflecting surface 36 is compressed in the extension corresponding direction ED1. Since the footprint PF of the projection beam PB is also compressed in the extension corresponding direction ED1, the dimension of the scanning mirror 34 in the extension corresponding direction ED1 is shortened.

As shown in FIG. 4, the scanning mirror 34 is capable of swinging within a finite angular range AR with reference to the rotation shaft 33 parallel to the extension corresponding direction ED1. The reflection angle of the projection beam PB reflected by the reflecting surface 36 also changes in accordance with the change in the orientation of the reflecting surface 36 due to the swing motion. The projection beam PB is temporally and spatially scanned toward the measurement area MA.

The scanning in this embodiment means one-dimensional scanning in which scanning in the extension corresponding direction ED1 is omitted. The spot shape of the projection beam PB reflected by the reflecting surface 36 at the infinity substantially corresponds to the illumination range of the projection beam PB in the phase of the swing motion. In the vehicle-mounted state, this illumination range is elongated in the vertical direction. Therefore, the vertical view angle in the measurement area MA can be widened even if the scanning mirror 34 does not perform scanning corresponding to the vertical direction.

The illumination range of the projection beam PB elongated in the vertical direction is moved by the swing motion along the direction perpendicular to the extension corresponding direction ED1, that is, along the horizontal direction. The finite angular range AR in the swing motion defines the horizontal view angle in the measurement area MA. A portion of the projection optical axis POA between the scanning mirror 34 and the measurement area MA swings along the horizontal direction according to the swing motion of the scanning mirror 34. However, the direction and position of the portion of the projection optical axis POA between the scanning mirror 34 and the measurement area MA is determined uniquely relative to a predetermined phase of the swing motion (in other words, a predetermined orientation of the reflecting surface 36).

The finite angular range AR is limited by a mechanical stopper, an electromagnetic stopper, or by controlling the drive mechanism. The reflection angle of the projection beam PB is the maximum at the end AR1 within the maximized finite angular range AR. The end AR1 is set such that the projection beam PB reflected by the scanning mirror 34 avoids deviating from the optical window 14 and the interference with the light shielding container 12.

The reflection angle of the projection beam PB is the minimum at the end AR2 within the maximized finite angular range AR. The end AR2 is set such that the projection beam PB reflected by the scanning mirror 34 is prevented from interfering with the light projection unit 21. The corner of the projection holding member 28 facing the optical window 14, where the projection beam PB is emitted, has a concave portion 29 recessed toward the projecting optical system 26. The footprint PF of the projection beam PB reflected by the scanning mirror 34 enters the space formed by the concave portion 29. As a result, the settable range of the end AR2 can be expanded where the reflection angle of the projection beam PB is the smallest within the finite angular range AR.

The projection beam PB scanned within the finite angular range AR passes through the optical window 14. As shown in FIG. 3, the optical window 14 is arranged at the position where the image of the light emitting window 23 is in a non-image state, between the projecting optical system 26 and the conjugate point of the light emitting window 23, on the projection optical axis POA. The optical window 14 is provided so that the projection beam PB is incident outside the range of the depth of focus by the image of the light emitting window 23 that forms an image at infinity. That is, the optical window 14 is located further away from the projecting optical system 26 than the end of the depth of focus facing the projecting optical system 26. Therefore, the projection beam PB is incident on the optical window 14 in a state where the circle of confusion in the image of the light emitting window 23 is larger than or equal to the permissible circle of confusion.

Furthermore, the optical window 14 is arranged at a position (Dp=Dw) where the spot shape of the projection beam PB forms the near field pattern NFP. That is, each small spot SS on the reflecting surface 36 of the projection beam PB has an ellipticity smaller than that on the reflecting surface 36 (that is, close to a circle), while the elliptical shape has the minor axis along the extension corresponding direction ED1. Therefore, the aspect ratio of the footprint PF of the projection beam PB on the optical window 14 is compressed in the extension corresponding direction ED1 as compared with the aspect ratio of the elongated emission window 23 and the line-shaped spot at the infinity. Thus, the dimension of the optical window 14 in the extension corresponding direction ED1 can be shortened.

The projection beam PB is transmitted through the optical window 14 and then reflected by the measurement target object existing in the measurement area MA. The reflected beam RB, which is the projection beam PB reflected by the measurement target object, again passes through the optical window 14 and enters the scanning mirror 34. The speeds of the projection beam PB and the reflected beam RB are sufficiently higher than the speed of the swing motion of the scanning mirror 34. Therefore, the difference between the phase of the swing motion when the projection beam PB is reflected by the scanning mirror 34 and the phase of the swing motion when the reflected beam RB is incident on the scanning mirror 34 is slight and can be ignored. Therefore, the reflected beam RB is reflected at substantially the same reflection angle as the projection beam PB, and is guided to the light receiving unit 41 so as to travel in the direction opposite to the projection beam PB.

Figure 6:
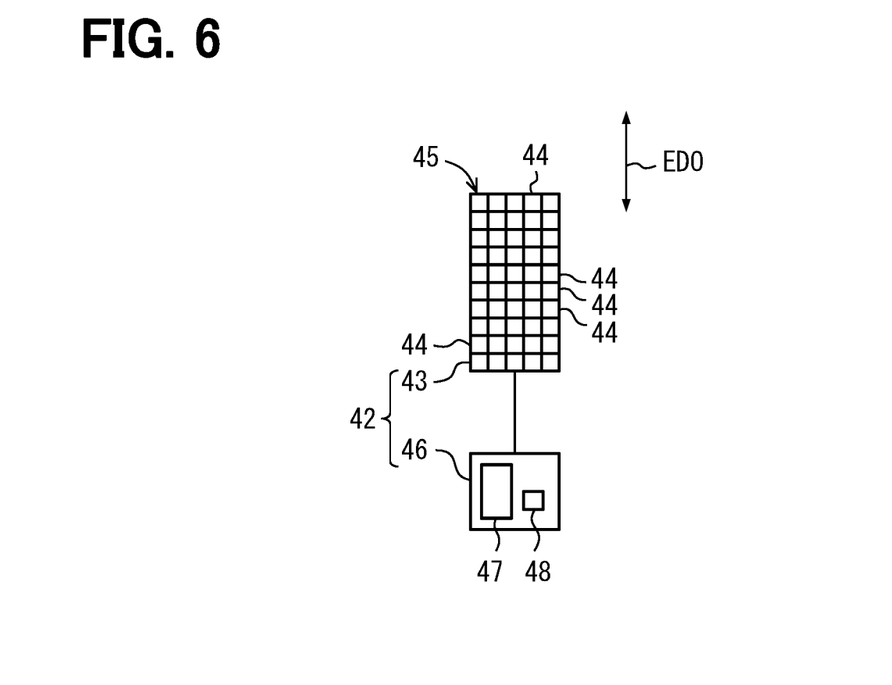
FIG. 6 is a diagram showing a configuration of a detection unit.

As shown in FIGS. 1 and 5, the light receiving unit 41 includes a detection unit 42, a receiving optical system 49, and a light receiving holding member 51. As shown in FIG. 6, the detection unit 42 in this embodiment has a light receiving element array 43 and a decoder 46. The light receiving element array 43 has plural light receiving elements 44 arranged in an array. As the light receiving element 44, a single photon avalanche photodiode (SPAD) light receiving element is adopted. The light receiving elements 44 are two-dimensionally arranged in a highly integrated state on the rectangular detection surface 45. Note that only some of the light receiving elements 44 shown in FIG. 6 are denoted by reference numerals.

The longitudinal direction of the detection surface 45 is aligned with the extension direction ED0 of the light emitting window 23. The reflected beam RB corresponding to the projection beam PB which is linear at the infinity can also be a linear beam. The detection surface 45 has a shape that matches the spread of the reflected beam RB. As a result, the detection unit 42 can efficiently receive the reflected beam RB, and the detection accuracy is improved.

When one or more photons are incident, each SPAD light receiving element 44 generates one electric pulse by an electron multiplying operation by avalanche doubling (so-called Geiger mode). That is, each light receiving element 44 can directly generate an electric pulse as a digital signal without using an AD conversion circuit from an analog signal to a digital signal. Therefore, the detection result of the reflected beam RB focused on the detection surface 45 via the receiving optical system 49 can be read at high speed.

The decoder 46 is provided to output the electric pulse generated by the light receiving element 44, and includes a selection circuit 47 and a clock oscillator 48. The selection circuit 47 is mounted in the form of, for example, an integrated circuit, and sequentially selects the light receiving element 44 from which the electric pulse is output, among the light receiving element array 43. The selected light receiving element 44 outputs an electric pulse to the controller 61. In this way, when the selection circuit 47 finishes selecting the light receiving element 44 to output once each, one sampling is completed. The selection circuit 47 periodically repeats sampling from a time when the projection beam PB is emitted at a predetermined emission timing. This sampling period corresponds to the clock frequency output from the clock oscillator 48. The clock oscillator 48 is provided inside or outside the integrated circuit of the selection circuit 47.

As shown in FIGS. 1 and 5, the receiving optical system 49 receives the reflected beam RB and focuses the reflected beam RB on the detection surface 45. The receiving optical system 49 is arranged between the detection unit 42 and the scanning mirror 34. The receiving optical system 49 includes one or more optical lenses 50. The diameter of the optical lens 50 of the receiving optical system 49 is made larger than the diameter of the optical lens 27 of the projecting optical system 26. In this way, the efficiency of collecting the reflected beam RB by the receiving optical system 49 can be improved. The receiving optical system 49 forms a receiving optical axis ROA. The receiving optical axis ROA is defined, for example, along an imaginary ray passing through the center of curvature of each refracting surface of one or more optical lenses 50. The imaginary ray along the receiving optical axis ROA can pass through the receiving optical system 49 by traveling straight through each lens vertex 50a without being deflected. In the present embodiment, the principal ray of the reflected beam RB that is incident on the center point of the detection surface 45 is along the receiving optical axis ROA. The principal ray of the reflected beam RB may be a virtual ray depending on the reflection mode of the projection beam PB by the measurement target object. When the light beam along the receiving optical axis ROA is deflected by the scanning unit 31, the receiving optical axis ROA is also defined as including an extended portion along the deflection direction.

A portion of the receiving optical axis ROA between the measurement area MA and the scanning mirror 34 swings along the horizontal direction in the vehicle mounted state in accordance with the swing motion of the scanning mirror 34. However, the direction and position of the portion of the receiving optical axis ROA between the measurement area MA and the scanning mirror 34 is uniquely determined with respect to a predetermined phase of the swing motion.

The range of the footprint RF of the reflected beam RB received by the receiving optical system 49 may be defined by the detection surface 45 functioning as a substantial diaphragm, while the receiving optical axis ROA penetrates the center point. Alternatively, the range of the footprint RF may be defined by disposing a diaphragm in the receiving optical system 49, while the receiving optical axis ROA penetrates the center point.

The light receiving holding member 51 shown in FIG. 5 is formed as a lens barrel of the receiving optical system 49. The light receiving holding member 51 is formed in a tubular shape for holding one or more optical lenses 50 of the receiving optical system 49, and is made of, for example, synthetic resin or metal so as to have a light-shielding property. The light receiving holding member 51 may be formed so as to further hold the detection unit 42.

As shown in FIGS. 1 and 5, the projection optical axis POA and the receiving optical axis ROA are offset from each other in the entire area inside the housing chamber 13 and outside the housing chamber 13. Specifically, the projection optical axis POA and the receiving optical axis ROA are arranged substantially parallel to each other with a space therebetween and along the common direction. The utilization efficiency of the projection beam PB and the reflected beam RB can be improved by arranging the projection optical axis POA and the receiving optical axis ROA along a direction perpendicular to the rotation shaft 33.

The positional relationship between the projection optical axis POA and the receiving optical axis ROA in an area between the measurement area MA and the scanning mirror 34 is also uniquely determined according to the orientation of the reflecting surface 36 common for the beams PB and RB. The mutually offset form (specifically, the parallel arrangement form) is maintained regardless of the phase of the swing motion.

The projecting optical system 26 and the receiving optical system 49 are arranged side by side in a direction along the rotation shaft 33 for the swing motion, that is, along the extension direction ED0 of the light emitting window 23. Then, the receiving optical system 49 can efficiently receive the reflected beam RB that is reflected by the common reflecting surface 36 at substantially the same reflection angle as the projection beam PB.

Due to the arrangement of the projecting optical system 26 and the receiving optical system 49, it is possible to suppress the projection beam PB from interfering with the light receiving holding member 51 and the reflected beam RB from interfering with the projection holding member 28. Further, as a result of adjusting the distance from the scanning mirror 34 to the projecting optical system 26 and the distance from the scanning mirror 34 to the receiving optical system 49, it is possible to reduce the size of the housing chamber 13 in the common direction along the optical axis POA, ROA.

Figure 7:
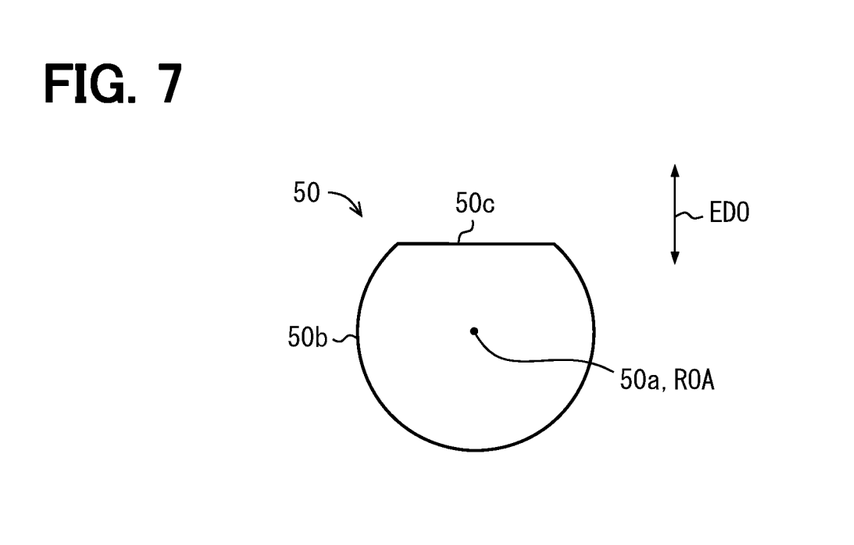
FIG. 7 is a diagram showing an outer peripheral contour of an optical lens of a light-receiving optical system.

As shown in FIGS. 5 and 7, in the light receiving optical system 49, the optical lens 50 including the receiving optical axis ROA is subjected to outer peripheral cutting processing such as so-called D cut and I cut. More specifically, the outer peripheral contour of the optical lens 50 is shaped by a combination of an arc contour portion 50b formed in an arc shape and a string contour portion 50c formed in a string shape at a portion facing the projecting optical system 26. The light receiving holding member 51 formed in a tubular shape surrounding the outer peripheral contour has a flat portion 52 formed in a flat shape at a position facing the light projecting optical system 26. It is possible to reduce the distance between the projection optical axis POA and the receiving optical axis ROA due to the shape of the light receiving unit 41.

The optical lens 27 including the projection optical axis POA in the light projecting optical systems 26 is formed in a round ball shape that is not subjected to outer peripheral cutting processing such as D cut and I cut. That is, the outer peripheral contour of the optical lens 27 is formed in a circular shape all around. The lens diameter is smaller in the optical lens 27 of the light projecting optical system 26 than the optical lens 50 of the light receiving optical system 49. Therefore, the effect of reducing the distance between the projection optical axis POA and the receiving optical axis ROA by cutting the outer periphery is small.

In the vehicle mounted state, the receiving optical system 49 is arranged lower than the projecting optical system 26. Since the diameter of the optical lens 50 is larger than that of the optical lens 27 of the projecting optical system 26, the weight of the receiving optical system 49 or the light receiving unit 41 is larger than the weight of the projecting optical system 26 or the light projecting unit 21. Therefore, the center of gravity of the optical detector 10 can be lowered downward, and the installation stability of the optical detector 10 in a vehicle can be improved.

As shown in FIG. 1, the footprint PF of the projection beam PB increases the cross-sectional area perpendicular to the projection optical axis POA as going from the projecting optical system 26 toward the measurement area MA in the projection optical axis POA. Due to the scanning by the scanning mirror 34, the horizontal expansion width of the cross-sectional area of the footprint PF is increased in the area between the measurement area MA and the scanning mirror 34 relative to the area between the projecting optical system 26 and the scanning mirror 34.

Similarly, the footprint RF of the reflected beam RB increases the cross-sectional area perpendicular to the receiving optical axis ROA as going from the receiving optical system 49 toward the measurement area MA in the receiving optical axis ROA. Due to the scanning by the scanning mirror 34, the horizontal expansion width of the cross-sectional area of the footprint RF is increased in the area between the measurement area MA and the scanning mirror 34, relative to that in the area between the receiving optical system 49 and the scanning mirror 34. The horizontal expansion width means an increase in the horizontal direction in the cross-sectional area of the footprint per unit length along the optical axis.

An overlap OL in which the footprint PF of the projection beam PB and the footprint RF of the reflected beam RB overlap each other is formed inside the housing chamber 13. The size of the housing chamber 13 can be reduced by the volume of the overlap OL in the present embodiment in which the overlap OL is provided, compared with a comparison structure in which the footprints PF and RF are completely separated from each other.

In the present embodiment, the footprint PF of the projection beam PB and the footprint RF of the reflected beam RB partially overlap with each other on the reflecting surface 36 of the scanning mirror 34. Specifically, the footprints PF and RF overlap with each other on the cross section of the reflecting surface 36 including the direction along the rotation shaft 33. As a result, the dimension of the reflecting surface 36 along the extension corresponding direction ED1 can be reduced. Therefore, the size of the scanning mirror 34 or the housing chamber 13 can be reduced.

The controller 61 controls the measurement in the measurement area MA, and controls the swing motion of the scanning mirror 34. As shown in FIG. 1, the controller 61 has a computer including a processing unit 62, a RAM 63, a storage unit 64, an input/output interface 65, and a bus connecting them. The processing unit 62 is hardware for arithmetic processing and combined with the RAM 63. The processing unit 62 includes at least one arithmetic core such as a CPU (Central Processing Unit), a GPU (Graphical Processing Unit), and a RISC (Reduced Instruction Set Computer). The processing unit 62 may include at least one arithmetic core such as FPGA (Field-Programmable Gate Array) and ASIC (Application Specific Integrated Circuit).

The processing unit 62 executes various processes for realizing the function of each functional unit described later by accessing the RAM 63. The storage unit 64 includes at least one non-volatile storage medium. A program executed by the processing unit 62 is stored in the storage unit 64.

Figure 8:
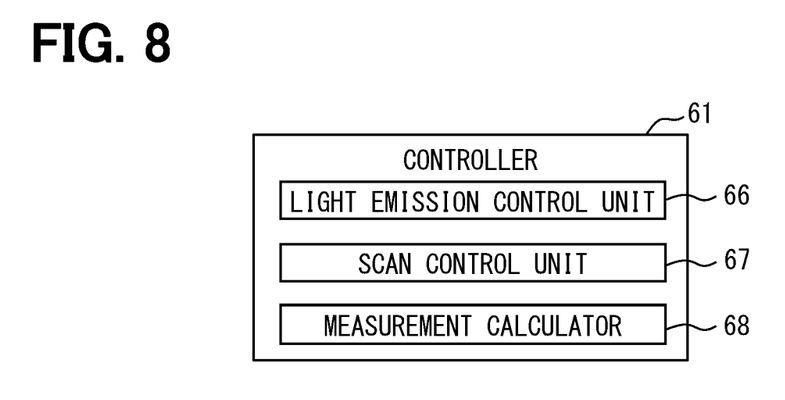
FIG. 8 is a block diagram showing a controller.

The controller 61 is electrically connected to or can wirelessly communicate with the light emitting unit 22, the drive motor 32, and the detection unit 42. As shown in FIG. 8, the controller 61 has functional units such as a light emission control unit 66, a scan control unit 67, and a measurement calculator 68.

The light emission control unit 66 outputs an electric signal to the light emitting unit 22 so that each laser oscillation element 24 emits the projection beam PB at a light emission timing associated with the scanning by the scanning mirror 34.

The scan control unit 67 outputs an electric signal to the drive motor 32 so that the scan associated with the light emission timing of the projection beam PB is realized.

The measurement calculator 68 performs arithmetic processing on the electric pulse input from the detection unit 42 to detect the presence/absence of the measurement target object in the measurement area MA and measure the distance to the measurement target object. The measurement calculator 68 counts the number of electric pulses output from each of the light receiving elements 44 in each sampling after the emission of the projection beam PB. The measurement calculator 68 generates a histogram in which the number of electric pulses for each sampling is recorded. The class of this histogram shows the flight time of light from the emission of the projection beam PB to the incidence of the reflected beam RB on the light receiving element 44, that is, TOF (Time Of Flight). The sampling period by the decoder 46 corresponds to a time resolution in TOF measurement.

In the present embodiment, the footprint PF of the projection beam PB and the footprint RF of the reflected beam RB are overlapped with each other. The optical path of the reflected beam RB returning from the measurement area MA is geometrically inseparable from an optical path of noise light which is the projection beam PB reflected by the cover plate 15 for the optical window 14. Therefore, the decoder 46 of the present embodiment sets the sampling period such that the reflected beam RB can be separated from the noise light by time. The sampling period is set, for example, in the range of 100 ns or less, such as several ns or the like.

Then, the measurement calculator 68 of the present embodiment excludes the class corresponding to the TOF of the noise light from the generated histogram from the data used for calculation of the distance. The TOF of noise light can be estimated by multiplying the total of the distance from the light emitting unit 22 to the cover plate 15 and the distance from the cover plate 15 to the detection unit 42 by the speed of light.

The measurement calculator 68 specifies the distance to the object to be measured based on the histogram after excluding the TOF of the noise light. For example, the measurement calculator 68 can convert the TOF corresponding to the class having the highest frequency in the histogram into a distance to specify the distance to the object.

Figure 9:
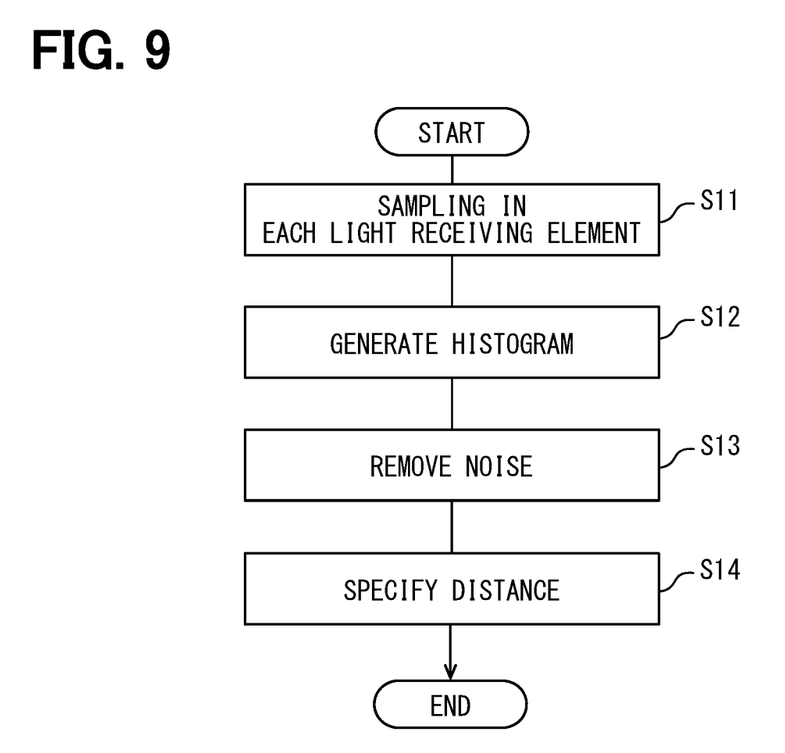
FIG. 9 is a flowchart executed by a decoder and a scanning controller.

Next, the measurement method of the measurement object carried out by the decoder 46 and the controller 61 will be described with reference to the flowchart of FIG. 9. The process according to the flowchart including steps is performed, for example, for each emission of the projection beam PB.

In S11, the decoder 46 performs sampling for each light receiving element 44 with the above-mentioned sampling cycle. Electric pulses are sequentially output from the detection unit 42 to the controller 61. After the process in S11, the process shifts to S12.

In S12, the measurement calculator 68 counts the number of electric pulses for each sampling and generates a histogram. After the process in S12, the process shifts to S13.

In S13, the measurement calculator 68 excludes the class corresponding to the TOF of the noise light, from the histogram, which is caused by the projection beam PB reflected by the cover plate 15 of the optical window 14 when calculating the distance. After the process in S13, the process shifts to S14.

In S14, the measurement calculator 68 specifies the distance to the measurement object from the histogram. A series of processes is completed by S14.

In the first embodiment, the decoder 46 of the detection unit 42 and the processing unit 62 of the controller 61 correspond to "at least one processor". Further, the cover plate 15 corresponds to a "cover member".

Operations and effects of the first embodiment will be described below.

According to the first embodiment, the overlapping region OL where the footprint PF of the projection beam PB and the footprint RF of the reflected beam RB overlap with each other is provided inside the housing chamber 13. Therefore, the housing chamber 13 can be reduced according to the volume of the overlapping region OL. In addition, since the projection optical axis POA and the receiving optical axis ROA are offset from each other, increase in space for arranging additional optical components for matching the two optical axes POA and ROA is suppressed. Thus, the housing chamber 13 can be downsized. Therefore, it is possible to provide the optical detector 10 having a configuration that can be easily downsized. Further, the effect of contributing to the downsizing is greater as the horizontal angle of view is larger by the swing of the scanning mirror 34 for emitting the projection beam PB.

Further, according to the first embodiment, the sampling period in the SPAD light receiving element 44 is set to a time at which the reflected beam RB can be separated from the noise light due to the projection beam PB reflected by the cover plate 15. Thus, it is possible to detect the reflected beam RB by reducing the influence of noise light while the footprint PF of the projection beam PB and the footprint RF of the reflected beam RB are overlapped with each other. Thus, it is possible to downsize while the detection accuracy is maintained.

Further, according to the first embodiment, the scanning mirror 34 is housed in the housing chamber 13, and has the reflecting surface 36 common to both the beams PB and RB. The reflecting surface 36 scans the projection beam PB from the projecting optical system 26 toward the measurement region MA, and guides the reflected beam RB toward the receiving optical system 49. The housing chamber 13 can be downsized by the reflecting surface 36 common for both the beams PB and RB.

Further, according to the first embodiment, the footprint PF by the projection beam PB and the footprint RF by the reflection beam RB partially overlap with each other on the common reflecting surface 36. Since the area of the reflecting surface 36 can be reduced by the overlap between the footprints on the reflecting surface 36, it is possible to downsize.

Further, according to the first embodiment, the projecting optical system 26 has a focal length to image the light emitting window 23 outside the housing chamber 13. Relative to the projecting optical system 26, the scanning mirror 34 is arranged at a position where the light emitting window 23 is in non-image state. More preferably, the scanning mirror 34 is located such that the projection beam PB is incident in the near-field pattern NFP. The footprint PF of the projection beam PB on the reflecting surface 36 is compressed relatively in the extension corresponding direction ED1, compared with the elongated shapes of the light emitting window 23 and the image of the light emitting window 23 outside the housing chamber 13. Therefore, since the size of the reflecting surface 36 can be reduced in the extension corresponding direction ED1, it is possible to downsize.

Further, according to the first embodiment, the optical window 14 is arranged at a position such that the light emitting window 23 is not imaged, with respect to the projecting optical system 26 having a focal length to image the light emitting window 23 outside the housing chamber 13. More preferably, the optical window 14 is arranged at a position such that the projection beam PB is incident in the near-field pattern NFP. Therefore, since the area of the optical window 14 can be reduced, it is possible to downsize.

Further, according to the first embodiment, the projection optical axis POA and the receiving optical axis ROA are arranged at a distance from each other and to extend in the common direction with each other. The beam can efficiently travel to a distant object to be measured while forming the overlapping region OL of the footprints PF and RF by offsetting the optical axes POA and ROA and setting the optical systems 26 and 49 in the common direction. Therefore, it is possible to downsize while improving the detection accuracy.

Further, according to the first embodiment, the outer peripheral contour of the optical lens 50 provided in the receiving optical system 49 has the arc contour portion 50b formed in an arc shape and the string contour portion 50c formed in a chord shape at a portion facing the projecting optical system 26 in an area excluding the range formed by the arc contour portion 50b. Therefore, a portion of the receiving optical system 49 facing the projecting optical system 26 can be suppressed from expanding to the projecting optical system 26. The receiving optical axis ROA can be brought closer to the projection optical axis POA. Therefore, it is possible to increase the overlapping region OL of the footprints PF and RF while offsetting the optical axes POA and ROA from each other. Therefore, it is possible to further downsize.

OTHER EMBODIMENTS

Although one embodiment has been described, the present disclosure should not be limited to the above embodiment and may be applied to various other embodiments within the scope of the present disclosure.

Specifically, as a first modification, the number of laser oscillation elements 24 in the light emitting unit 22 may be changed appropriately. That is, the number of small windows 25 in the light emitting window 23 may be appropriately changed, and may be one or more.

As a second modification, the light emitting unit 22 may be provided at plural positions. For example, the plural light emitting units 22 may be provided so that the light emitting windows 23 are arranged in the horizontal direction in the vehicle mounted state. One projecting optical system 26 may be provided for the plural light emitting units 22, or the same number of projecting optical systems 26 may be provided as the number of the light emitting units 22.

When one projecting optical system 26 is provided for plural light emitting units 22, the projection optical axis POA may be defined by a virtual main ray emitted from the average position of the center points of the light emitting windows 23.

When the same number of projecting optical systems 26 are provided for the plural light emitting units 22, the projection optical axes POA may be arranged along the common direction to each other, or may be arranged in different directions. When plural projecting optical systems 26 are provided to present plural projection beams PB, at least one footprint PF of the footprint PFs of the plural projection beams PB has an overlapping region OL with the footprint RF of the reflected beam RB.

As a third modification, the light emitting window 23 may have various shapes such as an elliptical shape, a circular shape, a square shape, and a polygonal shape. Therefore, the projection beam PB is not limited to forming an image of line shape outside the housing chamber 13, and may form image in various shapes.

As a fourth modification, the focal length of the projecting optical system 26 is set such that the light emitting window 23 is imaged outside the housing chamber 13, and is not limited to the focal length to image the light emitting window 23 at the infinity.

As a fifth modification, the optical lens 27 of the projecting optical system 26 may be subjected to outer peripheral cutting processing such as so-called D-cut and I-cut.

As a sixth modification, the optical lens 50 of the receiving optical system 49 may be formed in a round ball shape that is not subjected to the outer peripheral cutting process.

As a seventh modification, the scanning mirror 34 may not swing within a finite angle range AR, but may rotate 360 degrees in one direction. In this case, the reflecting surface 36 may be formed on both surfaces of the main body 35. Further, the scanning mirror 34 may perform two-dimensional scanning such as a polygon mirror.

As an eighth modification, the projection optical axis POA and the receiving optical axis ROA may not be arranged in parallel. For example, the distance between the projection optical axis POA and the receiving optical axis ROA may be set so as to gradually decrease as extended toward the measurement area MA from the projecting optical system 26 and the receiving optical system 49.

As a ninth modification, the footprint PF of the projection beam PB and the footprint PF of the reflected beam RB may have an overlapping region OL only in the space after reflection by the scanning mirror 34 inside the housing chamber 13. In this case, the reflecting surface 36 of the scanning mirror 34 may be provided separately for both the beams PB and RB, or the scanning mirror 34 itself may be provided separately for both the beams PB and RB.

As a tenth modification, the light projecting unit 21 and the light receiving unit 41 may not be arranged side by side, but may be arranged at separate positions separated from each other while the overlapping region OL is provided.

As an eleventh modification, the light receiving element 44 adopted in the detection unit 42 may be another light receiving element such as an APD light receiving element instead of the SPAD light receiving element.

As a twelfth modification, the controller 61 may be provided outside the housing chamber 13. Further, the controller 61 may be configured as an electronic control device independent of the optical detector 10.

As a thirteenth modification, a measurement calculation circuit may be provided in the detection unit 42. The calculation of the measurement calculator 68 of the controller 61 may be processed by the measurement calculation circuit of the detection unit 42. In this case, the histogram may be temporarily or permanently stored in the RAM 63 or the storage unit 64 of the controller 61. The detection unit 42 may further have a RAM or a non-volatile storage medium in addition to the measurement calculation circuit. In this case, the histogram may be temporarily or permanently stored in the RAM 63 or the storage medium of the detection unit 42. Further, the measurement calculation circuit may be separated from the selection circuit 47 of the decoder 46, or may be mounted as an integrated circuit common to the selection circuit 47.

The processor and the method described in the present disclosure may be realized by a processing unit of a dedicated computer programmed to execute one or a plurality of functions embodied by a computer program. Alternatively, the processor and the method described in the present disclosure may be realized by a dedicated hardware logic circuit. Further, the processor and the method thereof described in the present disclosure may be realized by a discrete circuit. Alternatively, the processor and the method described in the present disclosure may be any one selected from one or more processing units of a computer that executes a computer program, one or more hardware logic circuits, and one or more discrete circuits. It may be realized by a combination. The computer programs may be stored, as instructions to be executed by a computer, in a tangible non-transitory computer-readable medium.

What is claimed is:

1. An optical detector configured to project a projection beam toward a measurement area and detect a return beam from the measurement area, the optical detector comprising:
   a projecting optical system that forms a projection optical axis to project the projection beam;
   a receiving optical system that forms a receiving optical axis to receive the return beam;
   a housing having a housing chamber to house the projecting optical system and the receiving optical system, and an optical window for the projection beam and the return beam to travel between the housing chamber and the measurement area;
   a light emitting unit housed in the housing chamber to emit the projection beam by laser light toward the projecting optical system; and
   a scanning mirror housed in the housing chamber,
   wherein
   the light emitting unit has a light emitting window from which the projection beam is emitted toward the projecting optical system,
   the projecting optical system and the receiving optical system are arranged in a longitudinal direction of the light emitting window,
   the projection optical axis and the receiving optical axis are offset from each other to define an overlap region inside the housing chamber where a footprint of the projection beam and a footprint of the return beam overlap with each other,
   the scanning mirror is configured to move within an angular range around a rotation axis that is parallel to the longitudinal direction of the light emitting window,
   the projecting optical system is located between the light emitting window and the scanning mirror, the scanning mirror is positioned a distance from the light emitting window at which an aspect ratio of the footprint of the projection beam on a reflecting surface of the scanning mirror is compressed in the longitudinal direction of the light emitting window relative to an aspect ratio of the light emitting window and a line-shaped spot of the projection beam at infinity, the projection optical axis and the receiving optical axis are arranged at a distance from each other and to extend in a common direction that is common to each other, the projecting optical system and the receiving optical system are arranged adjacent to each other in a direction perpendicular to the common direction, the projecting optical system has a projecting optical lens arranged to include the projection optical axis, the projecting optical lens configured to collimate the projection beam emitted from the light emitting window, the receiving optical system has a receiving optical lens arranged to include the receiving optical axis, an outer peripheral contour of the projecting optical lens is circular in shape, and an outer peripheral contour of the receiving optical lens has an arc contour portion formed in an arc shape and a string contour portion formed in a string shape that faces a circular portion of the projecting optical lens at a position excluding a range formed by the arc contour portion.

2. The optical detector according to claim 1, further comprising:

a cover member that closes the optical window to be capable of transmitting both of the projection beam and the return beam;

a single photon avalanche photodiode light receiving element housed in the housing chamber to generate an electric pulse in response to a reception of a photon by the return beam passing through the receiving optical system; and at least one processor that sets a sampling period of the single photon avalanche photodiode light receiving element such that the return beam is separated from a noise light caused by the projection beam reflected by the cover member.

3. The optical detector according to claim 1, further comprising:

a scanning mirror housed in the housing chamber commonly for the projection beam and the return beam, wherein the scanning mirror has a reflecting surface to scan the projection beam from the projecting optical system toward the measurement area and to guide the return beam toward the receiving optical system.

4. The optical detector according to claim 3, wherein the footprint of the projection beam and the footprint of the return beam partially overlap with each other on the reflecting surface.

5. The optical detector according to claim 1, further comprising:

a scanning mirror housed in the housing chamber and having a reflecting surface that scans the projection beam from the projecting optical system toward the measurement area, wherein the projecting optical system has a focal length such that an image of the light emitting window is formed outside the housing chamber, and the scanning mirror is arranged at a position where an image of the light emitting window is in a non-imaging state.

6. The optical detector according to claim 5, wherein the scanning mirror is arranged at a position where the projection beam is incident in a near-field pattern.

7. The optical detector according to claim 1, wherein the projecting optical system has a focal length such that an image of the light emitting window is formed outside the housing chamber, and the optical window is arranged at a position where an image of the light emitting window is in a non-imaging state.

8. The optical detector according to claim 7, wherein the optical window is arranged at a position where the projection beam is incident in a near-field pattern.

9. The optical detector according to claim 1, wherein the projecting optical system is configured to collect the projection beam emitted from the light emitting unit and project a collected beam toward the scanning mirror, and the receiving optical system is configured to condense the return beam reflected by the scanning mirror in a detectable manner.

10. The optical detector according to claim 1, further comprising:

a detection unit configured to detect the return beam condensed by the receiving optical system, wherein the light emitting unit and the detection unit are arranged side by side along the longitudinal direction of the light emitting window and parallel to the rotation axis.

11. The optical detector according to claim 10, wherein the projection optical axis of the projecting optical system from the light emitting unit to the scanning mirror is parallel to the receiving optical axis of the receiving optical system from the light emitting unit to the detection unit.

12. The optical detector according to claim 1, wherein a diameter of the receiving optical lens of the receiving optical system is larger than a diameter of the projecting optical lens of the projecting optical system.

13. The optical detector according to claim 1, wherein a focal length of the projecting optical system is set such that the light emitting window is imaged outside the housing that houses the scanning mirror.

14. The optical detector according to claim 1, wherein the light emitting unit has a plurality of laser oscillation elements arranged in the longitudinal direction of the light emitting window that is parallel to the rotation axis, and each of the laser oscillation elements emits laser light as coherent light in a beam state through each window to form the projection beam.

15. The optical detector according to claim 1, wherein the arc contour portion is disposed below the string contour portion with respect to the direction of gravity.

16. An optical detector configured to project a projection beam toward a measurement area and detect a return beam from the measurement area, the optical detector comprising:

a projecting optical system that forms a projection optical axis to project the projection beam;

a receiving optical system that forms a receiving optical axis to receive the return beam;

a housing having a housing chamber to house the projecting optical system and the receiving optical system, and an optical window for the projection beam and the return beam to travel between the housing chamber and the measurement area;

a light emitting unit housed in the housing chamber to emit the projection beam by laser light toward the projecting optical system; and a scanning mirror housed in the housing chamber, wherein the light emitting unit has a light emitting window from which the projection beam is emitted toward the projecting optical system, the projecting optical system and the receiving optical system are arranged in a longitudinal direction of the light emitting window, the projection optical axis and the receiving optical axis are offset from each other to define an overlap region inside the housing chamber where a footprint of the projection beam and a footprint of the return beam overlap with each other, the scanning mirror is configured to move within an angular range around a rotation axis that is parallel to the longitudinal direction of the light emitting window, the projecting optical system is located between the light emitting window and the scanning mirror, the scanning mirror is positioned a distance from the light emitting window at which an aspect ratio of the footprint of the projection beam on a reflecting surface of the scanning mirror is compressed in the longitudinal direction of the light emitting window relative to an aspect ratio of the light emitting window and a line-shaped spot of the projection beam at infinity, the projection optical axis and the receiving optical axis are arranged at a distance from each other and to extend in a common direction common to each other, the projecting optical system and the receiving optical system are arranged adjacent to each other in a direction perpendicular to the common direction, the receiving optical system has an optical lens arranged to include the receiving optical axis, and an outer peripheral contour of the optical lens has an arc contour portion formed in an arc shape and a string contour portion formed in a string shape that faces the projecting optical system at a position excluding a range formed by the arc contour portion, and the arc contour portion is disposed below the string contour portion with respect to the direction of gravity.

* * * * *